United States Patent [19]

Nomura et al.

[11] Patent Number: 4,866,520

[45] Date of Patent: Sep. 12, 1989

[54] VIDEO SYSTEM FOR DISPLAYING LOWER RESOLUTION VIDEO SIGNALS ON HIGHER RESOLUTION VIDEO MONITORS

[75] Inventors: Kunihiro Nomura, Kawasaki; Tetsuo Machida, Setagaya; Kazunari Yamada, Hadano; Toshio Takekoshi, Isehara, all of Japan

[73] Assignee: Hitachi, Ltd., Tokyo, Japan

[21] Appl. No.: 161,782

[22] Filed: Feb. 29, 1988

[30] Foreign Application Priority Data

Mar. 4, 1987 [JP] Japan .................. 62-47536

[51] Int. Cl.⁴ .............................................. H04N 7/01
[52] U.S. Cl. ..................................... 358/140; 358/22; 340/728
[58] Field of Search ................. 358/140, 160, 22, 180; 340/728, 731

[56] References Cited

U.S. PATENT DOCUMENTS

| | | | |
|---|---|---|---|
| 4,322,750 | 3/1982 | Lord et al. | 358/140 |
| 4,402,012 | 8/1983 | Knight | 358/180 X |
| 4,610,026 | 9/1986 | Tabata et al. | 358/180 X |
| 4,713,685 | 12/1987 | Nishimura et al. | 358/140 X |
| 4,746,981 | 5/1988 | Nadan | 340/731 X |
| 4,768,092 | 8/1988 | Ishikawa | 358/140 |

FOREIGN PATENT DOCUMENTS 0111362 6/1984 European Pat. Off. .
1525915 9/1978 United Kingdom .
1592486 7/1981 United Kingdom .
2090505 7/1982 United Kingdom .

OTHER PUBLICATIONS

European Search Report dated Jul. 7, 1988 (Appln. No. 88101882.4).

M. C. W. van Bull and L. J. van de Polder, "Standards Conversion of a Videophone Signal with 313 Lines into a TV Signal with 625 Lines", Philips Res. Repts 29, 413-428, Sep. 1974.

"Trend of Modern Digital Television Receiver", Journal of Electronic Communications, vol. 68, No. 3 (English translation) undated.

"Digital Processing Technology of Video Signals and a Case Study", Nippon Kogyo Gijutu Center, 1986, pp. 56-58 (English translation).

Primary Examiner—James J. Groody
Assistant Examiner—Victor R. Kostak
Attorney, Agent, or Firm—Fay, Sharpe, Beall, Fagan, Minnich & McKee

[57] ABSTRACT

Lower resolution video signals (10) having alternating odd fields (12) and even fields (14) are stored in an odd line memory 20A and an even line 20B, respectively. An interpolator 22 interpolates adjacent odd and even lines. A selector 24 cyclically selects odd, even, and interpolated lines in a pre-selected pattern, such as one of the patterns illustrated in FIGS. 1, 7, 8A-F, and 9A-F. By selecting even, odd, and interpolated lines, the number of lines per picture is increased to produce a higher resolution video signal (30).

16 Claims, 9 Drawing Sheets

| $M = \frac{7}{4}$ | |
|---|---|
| ODD FIELD | EVEN FIELD |
| 1 | (1+2)/2 |
| 2 | 2 |
| 3 | (3+4)/2 |
| 4 | 5 |
| (5+6)/2 | 6 |
| 6 | 7 |
| (7+8)/2 | 8 |
| ⋮ | ⋮ |
| 481 | (481+482)/2 |
| 482 | 482 |
| 483 | (483+484)/2 |
| 484 | 485 |

FIG. 8A

| M = 2 | |
|---|---|
| ODD FIELD | EVEN FIELD |
| 1 | |
| | (1+2)/2 |
| (1+2)/2 | |
| | 2 |
| 3 | |
| | (3+4)/2 |
| (3+4)/2 | |
| | 4 |
| 5 | |
| | (5+6)/2 |
| (5+6)/2 | |
| | 6 |
| 7 | |
| | (7+8)/2 |
| (7+8)/2 | |
| | 8 |
| 9 | |
| | (9+10)/2 |
| (9+10)/2 | |
| | 10 |
| ⋮ | ⋮ |

FIG. 8B

| M = 4 | |
|---|---|
| ODD FIELD | EVEN FIELD |
| 1 | |
| | 1 |
| 1 | |
| | (1+2)/2 |
| (1+2)/2 | |
| | 2 |
| | 2 |
| 3 | |
| 3 | |
| | (3+4)/2 |
| (3+4)/2 | |
| | 4 |
| | 4 |
| 5 | |
| | 5 |
| ⋮ | ⋮ |

FIG. 8C

| M = 2, 4, 6 ··· | |
|---|---|
| ODD FIELD | EVEN FIELD |
| ⋮ | ⋮ |
| A(N) — 1st | A(N) — 1st |
| ⋮ | ⋮ |
| A(N) | A(N) |
| (A(N)+B(N))/2 — (M/2)th | (A(N)+B(N))/2 — (M/2)th |
| B(N) | B(N) |
| ⋮ | ⋮ |
| B(N) — mth | B(N) — mth |
| mth | |

| M = 3 | |
|---|---|
| ODD FIELD | EVEN FIELD |
| 1 | |
| | 1 |
| (1+2)/2 | |
| | (1+2)/2 |
| 2 | |
| | 2 |
| 3 | |
| | 3 |
| (3+4)/2 | |
| | (3+4)/2 |
| 4 | |
| | 4 |
| 5 | |
| | 5 |
| (5+6)/2 | |
| | (5+6)/2 |
| 6 | |
| | 6 |
| ⋮ | ⋮ |

FIG. 8E

| M = 5 | |
|---|---|
| ODD FIELD | EVEN FIELD |
| 1 | |
| | 1 |
| 1 | |
| | 1 |
| (1+2)/2 | |
| | (1+2)/2 |
| 2 | |
| | 2 |
| 2 | |
| | 2 |
| 3 | |
| | 3 |
| 3 | |
| | 3 |
| (3+4)/2 | |
| | (3+4)/2 |
| 4 | |
| | 4 |
| 4 | |
| | 4 |
| ⋮ | ⋮ |

FIG. 8F

| M = 3, 5, 7, 9 ··· | |
|---|---|
| ODD FIELD | EVEN FIELD |
| ⋮ | ⋮ |
| A(N) | A(N) |
| A(N) | A(N) |
| (A(N)+B(N))/2 | (A(N)+B(N))/2 |
| B(N) | B(N) |
| B(N) | B(N) |
| A(N+1) | |

| M = 3/2 | |
|---|---|
| ODD FIELD | EVEN FIELD |
| 1 | |
| | (1+2)/2 |
| 2 | |
| | 3 |
| (3+4)/2 | |
| | 4 |
| 5 | |
| | (5+6)/2 |
| 6 | |
| | 7 |
| (7+8)/2 | |
| | 8 |
| 9 | |
| | (9+10)/2 |
| 10 | |
| | 11 |
| (11+12)/2 | |
| | 12 |

FIG. 9B

| M = 7/2 | |
|---|---|
| ODD FIELD | EVEN FIELD |
| 1 | |
| | 1 |
| | (1+2)/2 |
| 2 | |
| | 2 |
| 2 | |
| | 3 |
| | 3 |
| (3+4)/2 | |
| | 4 |
| 4 | |
| | 4 |
| 5 | |
| | 5 |
| 5 | |
| | (5+6)/2 |
| 6 | |

FIG. 9C

| $M = \frac{m}{2}$ (m=3,7,11···) | |
|---|---|
| ODD FIELD | EVEN FIELD |
| 1 | |
| | 1 |
| 1 | |
| 2 | (1+2)/2 |
| | 2 |
| 2 | |
| 3 | 2 |
| | 3 |
| 3 | |
| (3+4)/2 | |
| 4 | 3 |
| | 4 |
| 4 | |
| | 4 |

FIG. 9D

| M = 5/2 | |
|---|---|
| ODD FIELD | EVEN FIELD |
| 1 | |
| | 1 |
| (1+2)/2 | |
| | 2 |
| 2 | |
| | 3 |
| 3 | |
| | (3+4)/2 |
| 4 | |
| | 4 |
| 5 | |
| | 5 |
| (5+6) | |
| | 6 |
| 6 | |
| | 7 |
| 7 | |
| | (7+8)/2 |
| 8 | |
| | 8 |

FIG. 9E

| M = 9/2 | |
|---|---|
| ODD FIELD | EVEN FIELD |
| 1 | |
| | 1 |
| | 1 |
| (1+2)/2 | |
| | 2 |
| 2 | |
| | 2 |
| 2 | |
| | 3 |
| 3 | |
| | 3 |
| 3 | |
| | (3+4)/2 |
| 4 | |
| | 4 |
| 4 | |
| | 4 |
| 5 | |

FIG. 9F

| $M = \frac{m}{2}$ (m=5,9,13···) | |
|---|---|
| ODD FIELD | EVEN FIELD |
| 1 | |
| | 1 |
| 1 | |
| (1+2)/2 | 1 |
| 2 | 2 |
| | 2 |
| 2 | |
| 3 | 3 |
| | 3 |
| 3 | |
| 4 | (3+4)/2 |
| | 4 |
| 4 | |
| | 4 |
| 5 | |
| | 5 |

FIG. 10

| M | FIELD ODD/EVEN | LENGTH | CYCLIC PATTERN | | |
|---|---|---|---|---|---|
| | | | $PP_D$ | $PP_E$ | SD |
| 1 | 0 | 1 | 1 | 0 | O |
| 1 | 1 | 1 | 0 | 1 | E |
| 2 | 0 | 2 | 10 | 10 | O A |
| 2 | 1 | 2 | 10 | 10 | A E |
| 3 | 0 | 3 | 100 | 100 | O A E |
| 3 | 1 | 3 | 100 | 100 | O A E |
| ⋮ | | | | | |
| n (EVEN) | 0 | n | 100······0 | 100······0 | $\overbrace{O \cdots}^{n/2} O A E \overbrace{\cdots E}^{n/2}$ |
| n (EVEN) | 1 | n | 100······0 | 100······0 | O ··· O A E ··· E |
| n (ODD) | 0 | n | 100······0 | 100······0 | $\overbrace{O \cdots}^{(n-1)/2} O A E \overbrace{\cdots E}^{(n-1)/2}$ |
| n (ODD) | 1 | n | 100······0 | 100······0 | O ··· O A E ··· E |

FIG. 11

| M | FIELD ODD/EVEN | LENGTH | CYCLIC PATTERN | | |
|---|---|---|---|---|---|
| | | | $PP_D$ | $PP_E$ | SD |
| 3/2 | 0 | 3 | 110 | 101 | O E A |
| 3/2 | 1 | 3 | 110 | 101 | A O E |
| 5/2 | 0 | 5 | 10100 | 10010 | O A E O E |
| 5/2 | 1 | 5 | 10100 | 10010 | O E O A E |
| 7/2 | 0 | 7 | 1001000 | 1000100 | O O E E O A E |
| 7/2 | 1 | 7 | 1001000 | 1000100 | O A E O O E E |
| 9/2 | 0 | 9 | 100010000 | 100001000 | O O A E E O O E E |
| 9/2 | 1 | 9 | 100010000 | 100001000 | O O E E O O A E E |
| n/2, n=3,7,... | 0 | n | 10··010···0 | 10··0010··0 | $\overbrace{O \cdots}^{(n-1)/2} \overbrace{O E \cdots}^{(n-1)/2} \overbrace{E O \cdots}^{(n+1)/4} \overbrace{O A E \cdots E}^{(n+1)/4-1}$ |
| n/2, n=3,7,... | 1 | n | 10··010···0 | 10··0010··0 | $O \cdots O A E \cdots E O \cdots O E \cdots E$ with $(n+1)/4-1$, $(n+1)/4-1$, $(n+1)/4$, $(n+1)/4$ |
| n/2, n=5,9,... | 0 | n | 10··010···0 | 10··0010··0 | $\overbrace{O \cdots}^{(n-1)/4} \overbrace{O A E \cdots}^{(n-1)/4} \overbrace{E O \cdots}^{(n-1)/4} \overbrace{O E \cdots E}^{(n-1)/4}$ |
| n/2, n=5,9,... | 1 | n | 10··010···0 | 10··0010··0 | $O \cdots O E \cdots E O \cdots O A E \cdots E$ with $(n-1)/4$ each |

VIDEO SYSTEM FOR DISPLAYING LOWER RESOLUTION VIDEO SIGNALS ON HIGHER RESOLUTION VIDEO MONITORS

BACKGROUND OF THE INVENTION

The present invention related to the video arts. It finds particular application in conjunction with adapting lower resolution interlaced television signals for display on higher resolution CRT displays of computer monitor and will be described with particular reference thereto. It is to be appreciated, however, that the invention will find other applications in the video signal processing field, such as adapting high resolution television monitors for use with low resolution broadcast signals, for zooming or magnifying video images, for converting video signals of one resolution to video signals of another resolution, and the like.

Television signals commonly comply with the National Television System Committe (NTSC) standards which call for 525 interlaced raster lines. The raster lines are scanned with a horizontal frequency of 15.75 kHz and a vertical frequency of 60 Hz. The odd raster lines, i.e. the 1st, 3rd, 5th, etc. alternate lines of the image are displayed alternately with the even raster lines, i.e. the 2nd, 4th, 6th, etc. alternately lines.

While this resolution has commonly been found acceptable for television images, higher resolution monitors are required to display computer data clearly and legibly. Although the resolution provided by the monitors varies, most computer monitors provide about 700 to 800 raster lines, a horizontal frequency nearly double the NTSC standard, and a vertical frequency of 60 Hz. That is, computer monitors commonly provide about 1½ times as many dots or pixels per raster line and about 1½ times as many raster lines per image. To fill the higher resolution computer monitor, the lower resolution video image must be expanded.

Heretofore, various interpolation schemes has been utilized for expanding the image. To expand the width of the image, about half of the dots were displayed more than once. For example, the even dots might be displayed once and each odd dot displayed twice. To increase the height of the image, alternate raster lines might be displayed twice. For example, in the odd field scan, the first line could be displayed, the third line could be displayed twice, the fifth line could be displayed, the seventh line could be displayed twice, and the like. Analogously, the even line field could be expanded to present: line 2, line 4, line 4, line 6, line 8, line 8, etc. One problem with this technique is that it weighted half of the lines more heavily than the other and caused a non-linear stretching of the image.

In another interpolation technique, the lines of the odd field were selectively averaged and the lines of the even field were selectively averaged. More specifically, after every two actual raster lines, a 3rd raster line was created by averaging the immediately preceding and the immediately following raster lines of the even or odd field. For example, the odd field might include line 1, line 3, the average of lines 3 and 5, line 5, line 7, the average of lines 7 and 9, etc. Analogously, the even field might include line 2, line 4, the average of lines 4 and 6, line 6, etc. One problem with this technique is that when the odd and even fields were interlaced, some of the data was displayed out of order. Specifically, in the resultant composite image or picture the line which was the average of lines 3 and 5 would be displayed below line 4. This placed some of the data from line 3 below line 4. Analogously, the next lowest line, the average of lines 4 and 6 placed data from line 6 above line 5.

Another interpolation scheme which kept the data in order required intermixing some data from the even and odd fields. More specifically, between pairs of lines of the odd field, the next line in sequence from the even field would be inserted. For example, the odd field might display lines 1, line 3, line 4, line 5, line 7, line 8, etc. Analogously, the even field might display line 2, line 4, line 5, line 6, line 8, line 9, etc. Although this technique kept the data in order, some of the lines were again displayed more often than others weighing the data from those lines more heavily.

The present invention provides a new and improved method and apparatus for converting video signals of a first resolution to video signals of another resolution.

SUMMARY OF THE INVENTION

In accordance with one aspect of the present invention, an apparatus is provided for enabling a lower resolution video signal to be displayed in a higher resolution video monitor, i.e. a monitor that has more raster lines and dots than the lower resolution video signal. A digitizing means digitizes each line of the lower resolution video signal to create a preselected plurality of digital values. A write address means determines appropriate memory addresses for each digital value, which addresses are indicative of a line number within the picture or frame and of a position along the line. A memory means stores each digital value at the address determined by the write address determining means. A read address means at a rate controlled by the higher resolution video monitor addresses stored data in the memory means to retrieve selected complete even and odd numbered lines of digital values. An odd line memory means receives and temporarily holds each odd numbered raster line of digital values retrieved from the memory means and an even line memory means receives and holds each even numbered line. An interpolating means is connected with the even and odd line memory means for interpolating the lines held therein. That is, the interpolating means interpolates, eg. averages, a retrieved even line with a retrieved odd line. A selecting means cyclically selects among even, odd, and interpolated lines of data for display on the high resolution video monitor.

In accordance with another aspect of the present invention, a method is provided for displaying lower resolution video signals on a higher resolution video monitor. The video signals include a series of odd numbered raster lines which form an odd field of an image and a series of even numbered lines which form an alternate even field of the image or picture. Each line is converted into a selected number of digital values and stored. Adjoining even and odd lines are cyclicly withdrawn and interpolated. The interpolated and at least one of the even and odd lines are arranged in a preselected sequence for display on the monitor.

In accordance with a more limited aspect of the present invention, the sequence in which the lines are arranged is selectively adjustable to adjust the resolution or magnification of the picture. In this manner, the picture may be selectively zoomed or enlarged to fill the display of the monitor or to display only an enlarged portion of the picture.

One advantage of the present invention is that it magnifies or enlarges the resultant displayed picture of a video signal.

Another advantage of the present invention is that it improves the apparent resolution of a video signal.

Further advantages of the present invention reside in reduced distortion, improved definition, and higher quality of the resultant picture.

Yet another advantage of the present invention is that it enables video signals with one set of horizontal and vertical frequencies to be displayed on a CRT that has different vertical or horizontal frequencies.

Further advantages of the present invention will become apparent to those with ordinary skill-in-the-art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
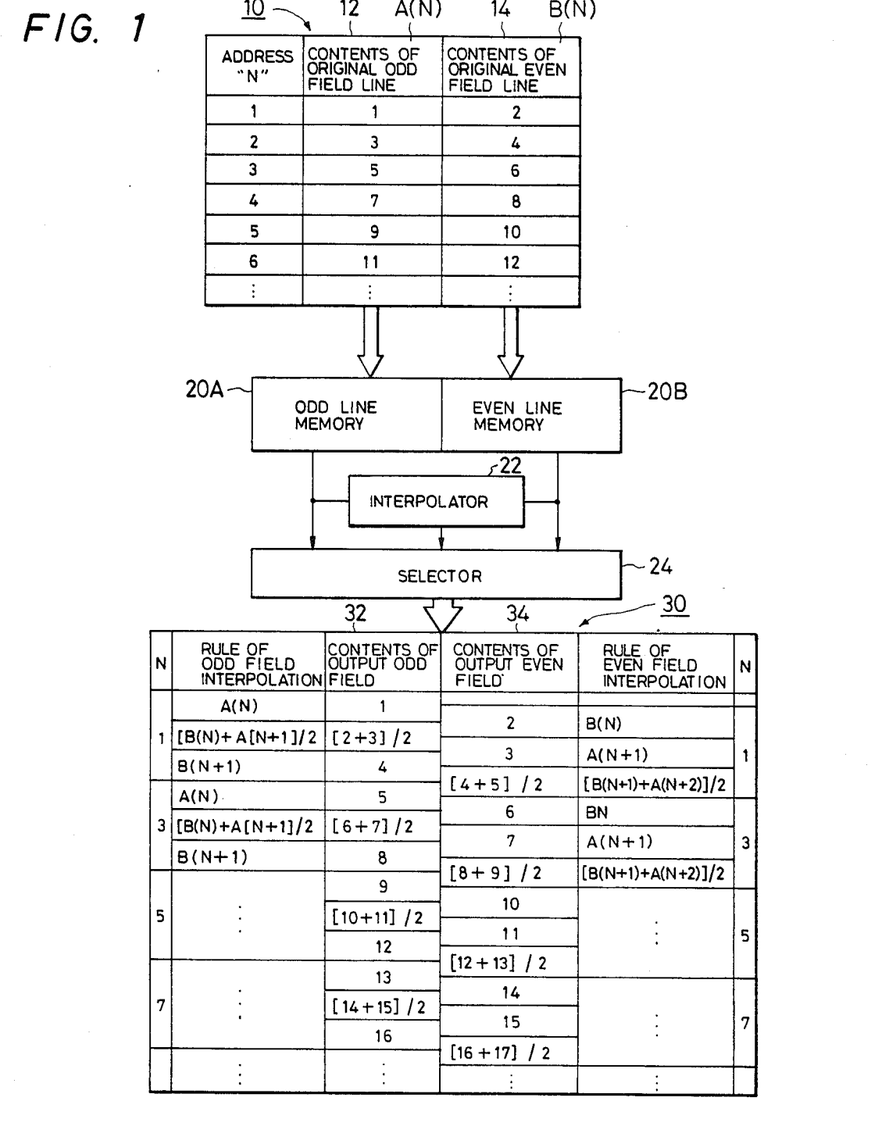
FIG. 1 is a diagramatic illustration of a method of expanding or magnifying data of a lower resolution video signal into a higher resolution video signal in accordance with the present invention.

With reference to FIG. 1, a lower resolution video signal 10, such as an NTSC format signal includes alternating odd fields 12 and even fields 14. Each odd field includes odd raster or scan lines, i.e. the 1st, 3rd, 5th, etc. lines of the picture to be displayed. Each even field includes the even raster lines, i.e. the 2nd, 4th, 6th, etc. lines. The video signal includes the odd scan lines arranged serially followed by the even scan lines arranged serially, followed by the lines of successive odd and even fields. Synchronization information is inserted between each scan line and each field.

The odd scan lines are stored in a first or odd line memory portion 20A and the even lines are stored in a second or even line memory portion 20B. Adjacent even and odd raster lines, eg. lines 4 and 5, are read contemporaneously and interpolated, eg. averaged, by an interpolating means 22. The interpolated raster line and one or both of the adjacent odd and even raster lines are selected in an appropriate sequence or pattern by a selecting means 24 to create a high resolution video signal 30.

By appropriately selecting the order of the odd, even, and interpolated lines, a high resolution video signal with a selected magnification is assembled. For simplicity of illustration, a magnification of 1½ is illustrated in FIG. 1.

The high resolution video signal 30 includes an odd field 32 and an even field 34. In the illustrated example, the odd field includes data lines arranged in a pattern $A(N)$, $[B(N)+A(N+1)]/2$, $B(N+1)$, ... $A(N)$ is the Nth raster line from the odd memory 20A and $B(N)$ in the Nth raster line from the even memory 20B. Analogously, the even field 34 of the high resolution signal includes signals of the pattern $B(N)$, $A(N+1)$, $[B(N+1)+A(N+2)]/2$ ... In this manner, the number of raster lines in both the even and odd fields are increased by 1½. Moreover, each raster line is displayed the same number of times, 1½ times, and is thus weighted equally. Further, in the resultant picture, data is displayed in order.

Figure 2:
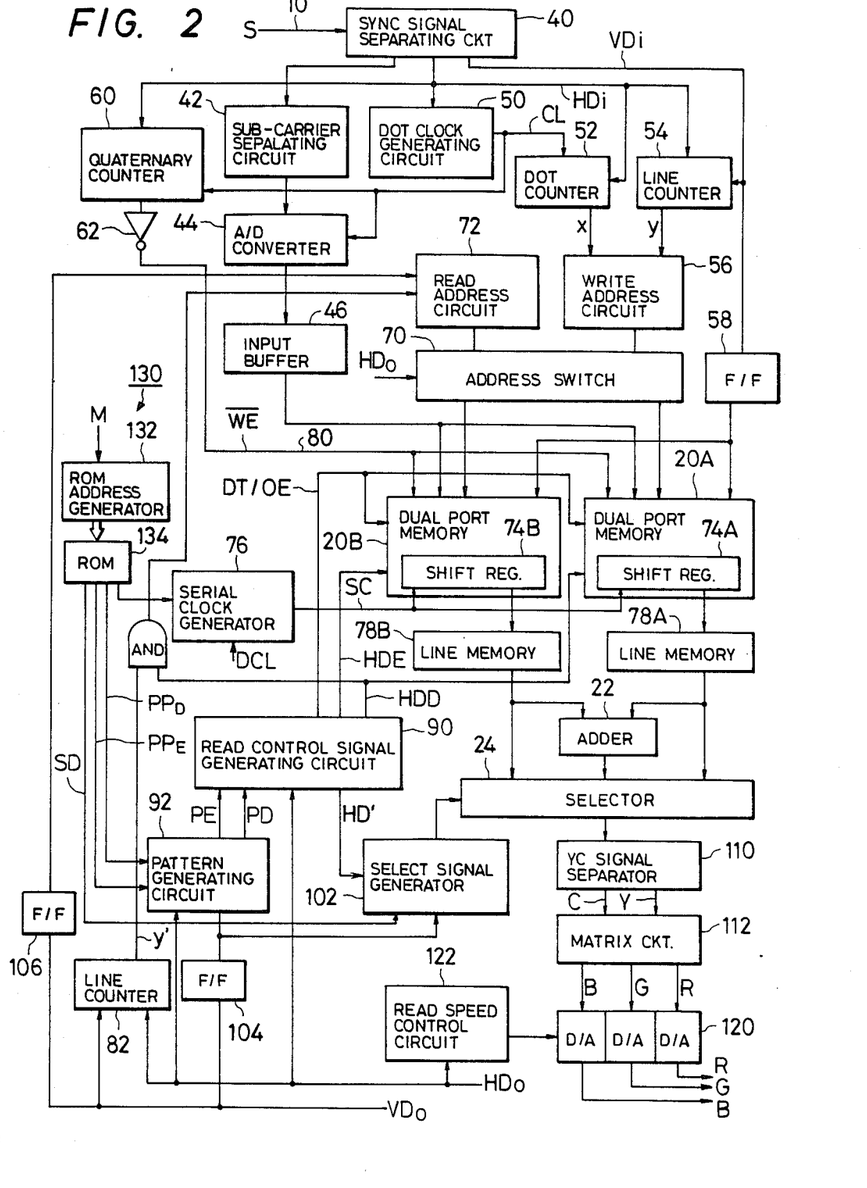
FIG. 2 is a block diagram of an apparatus for expanding the apparent resolution of video signals in accordance with the present invention.

With reference to FIG. 2, the low resolution video signal 10 is received by a synchronization signal separating circuit 40 which separates the picture data and synchronization data portions of HDi and VDi of the low resolution video signal. A sub-carrier separating circuit 42 removes the sub-carrier signals leaving an analog signal indicative of magnitude or picture intensity along each raster line. An analog to digital convertor means 44 with a regular periodicity converts the analog data signal to digital data values or dots which are transferred to an input buffer means 46. Digital data values or dots are written in groups from the input buffer 46 into the even and odd memory portions 20A and 20B.

A memory addressing means generates an address in the memory's 20A, 20B which is indicative of the raster line and position with inner raster line of each dot. More specifically, a dot or input clock 50 converts horizontal synchronization data from the synchronization signal separating circuit 40 into a clock pulse for clocking the analog to digital convertor 44 and other circuit components. In the preferred embodiment, the clock frequency is four times as great as that of subcarriers in synchronism with the horizontal synchronization frequency HDi. However, it is to be appreciated that other clock rates may be selected to increase or decrease the sampling rate of the analog data in each raster line. A dot counter 52 is incremented by each clock pulse to increment an x value of an (x,y) address for the even and odd memory portions 20A, 20B. A line counter 54 is reset by the vertical synchronization signal VDi separated from the low resolution video signal by the synchronization signal separating circuit 40 and incremented by the horizontal synchronization signal HDi to step the y portion of the (x,y) address. A write address circuit 56 converts the (x,y) picture address into appropriate memory addresses for the odd and even line memory portions 20A, 20B of memory means 20. An even and odd line separating or distinguishing means 58, such as a flip-flop circuit, is stepped by the vertical synchronization signal VDi to enable the odd and even memory portions to be addressed by or store alternate fields of data.

In the preferred embodiment, the analog digital convertor 44 samples the video signals at 4 times the frequency of the subcarriers. The memory portions 20A and 20B each have 910 lateral dots or memory addresses x and 525/2 vertical dots or memory addresses y. At each address, 8 bits of information can be stored. This enables one odd or even field to be stored in each memory at a time.

A divider 60 divides the clock frequency by 4. After every fourth clock pulse, an inverter 62 enables the odd and even memory portions to write the four dots stored in the input buffer 46. In this manner, four dots are stored concurrently.

Figure 3:
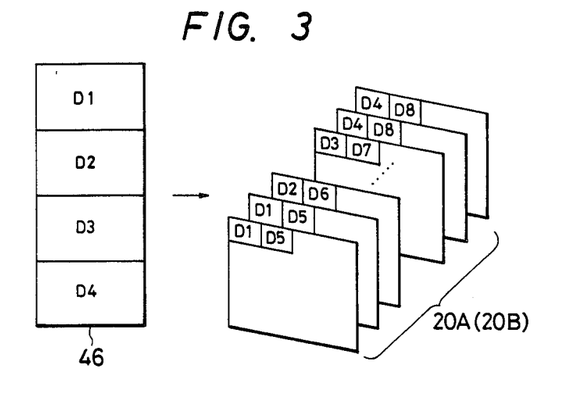
FIG. 3 is a diagramatic illustration of the structure of the dual port memory of FIG. 2.

With reference to FIG. 3, the memory portions 20A, 20B in the preferred embodiments each include 8 LSI's such as HM53461s. The input buffer 46 stores 4 dots of 8 bits each. The 4 dots are written into a random port of the memories in a single access period. Because the 8 LSI's of the preferred embodiment can each store 64 kilobytes$\times$4 bits, the 8 bits of each dot are written into 2 memory chips.

With reference again to FIG. 2, the high resolution monitor or CRT calls for a video signal with higher horizontal and vertical frequencies. To accommodate the video monitor, the dots are read from a serial port of the even and odd memory portions 20A, 20B at a different rate than they are written into the memory portions. The dual port memory arrangement enables the data to be written and read concurrently. The data is read synchronously with horizontal synchronizing signals HDo and vertical synchronizing signals VDo of the CRT independently of the writing operation.

As the horizontal synchronizing signal HDo enters its fly-back period, an address switching circuit 70 interconnects a read address circuit 72 with the dual port memory portions 20A, 20B. The appropriate addresses are generated by the read address circuit 72 to address one odd line of digital values or dots to a shift register 74A and an adjacent even line of dots to a shift register 74B. A serial clock 76 transfers the odd line digital values from the shift register 74A to an odd line memory means 78A and the even line digital values from the shift register 74B to an even line memory means 78B. The serial clock controls the shift register such that the length of each line is selectively magnified or extended. In the embodiment of FIG. 1 in which the data was expanded 1$\frac{1}{2}$ times, every other data value is loaded twice into the corresponding line memory. This doubling of half the digital values or dots magnifies each line by 150%. By doubling a different percentage of the dots, such as by changing the serial clock cycle, other magnifications are readily achieved. Optionally, rather than doubling a selected fraction of the dots, adjacent dots can be averaged or otherwise interpolated. While the contents of the shift registers 74A and 74B are being read into the line memories 78A and 78B, the address switching circuit 70 connects the write address circuit 56 with the dual port memories 20A and 20B.

Figure 4:
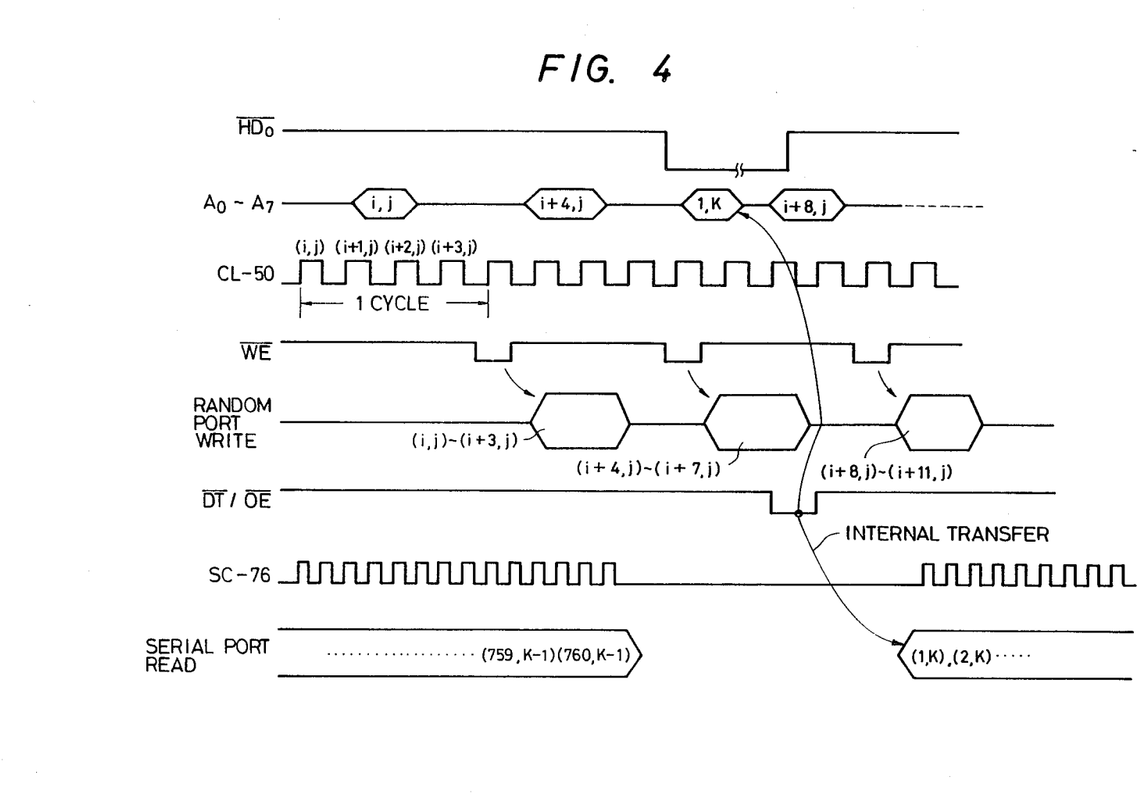
FIG. 4 is a time chart illustrating exemplary operation of the circuit of FIG. 2.

With reference to FIG. 4, the dot clock 50 generates clock pulses which enables a dot of digital data to be digitized with the analog convertor 44. After every fourth clock cycle, the divider 60 produces a write enable WE signal which enables the 4 digitized values or dots to be written at line 80 into the memory with the addresses set in line $A_o$–$A_7$. Concurrently, the clock signal SC from the signal clock 76 causes data from the K-th and (K-1)st lines of data in the memory means 20 to be read out. When the horizontal synchronizing signal HDo enters its flyback period, data from the dot (i+4, j) to dot (i+7, j) is written through the random port. The address switching means 70 that sets the memory address of the read start dot at (1,K). As the data is read out from the serial port, the next 4 dots are written into the memory from the random port. A data transfer signal DT/DE enables the data in the Kth and (K-1)st lines to be transferred.

A line counter 82 counts the horizontal synchronization signals HDo from the CRT to determine the line or y' value of the address to be read out. The line counter 82 is periodically reset by the vertical synchronization signal VDo. The read address circuit 72 converts the line address into appropriate addresses for addressing the memories 20A, 20B for retrieving lines of data.

Figure 5:
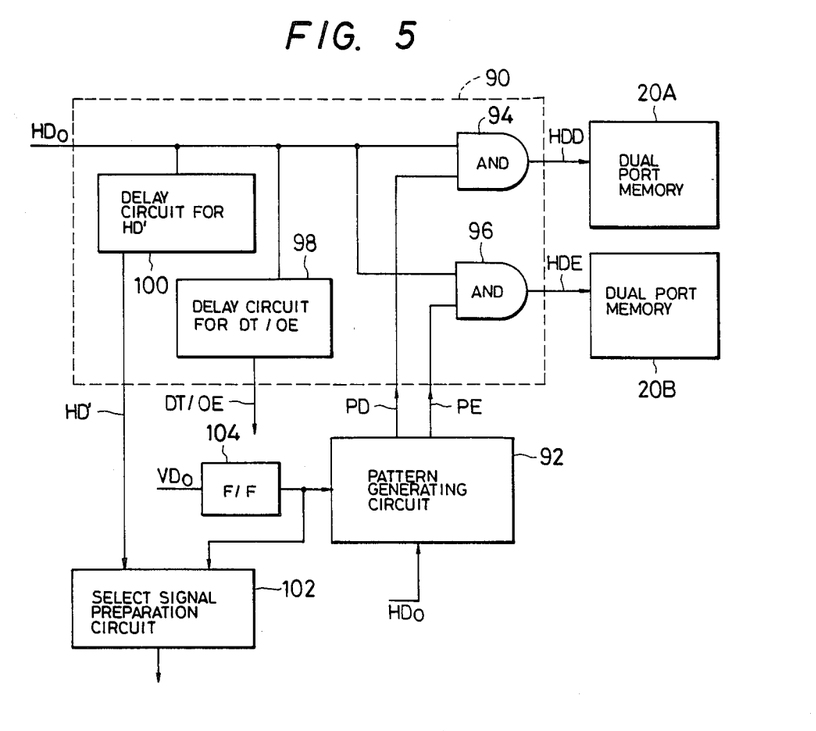
FIG. 5 is an expanded block diagram of a portion of the circuit of FIG. 2.

With continuing reference to FIG. 2 and further reference to FIG. 5, a read control circuit 90 produces a read control signals DT/OE which enable data addressed by the read address circuit 72 to be transferred from the memory portions 20A, 20B to the shift registers 74A, 74B, respectively. The read control circuit further generates odd and even memory control signals HDD and HDE which enable data to be read from the even and odd memory portions in accordance with a pattern generated by a pattern generating circuit 92. More specifically, the pattern generating circuit generates an odd pattern PD and an even pattern PE of digital values. The digital values are ANDed with the horizontal synchronization signals HDo by AND gates 94, 96. The data transfer output enable signal DT/OE is formed by a delay means 98 which inserts a preselected delay or lag in the horizontal synchronization signal HDo. The read control circuit further includes a delay circuit 100 for forming a selector enable signal HD' which lags each pulse of the horizontal synchronization signal HDo.

The interpolating means 22 in the preferred embodiment is an adding or averaging means for adding or averaging the corresponding dots or digital values of the lines stored in line memories 78A and 78B. The selecting means 24 again selects among the interpolated, even, and odd lines.

A selection sequence control circuit 102 responds to each selector enable pulse HD' by passing a control signal to the selecting means 24 such that a data line is selected in accordance with the order dictated by the read control means 90. A flip-flop circuit 104 counts alternate vertical synchronization signals VDo to switch the pattern generating circuit and the selection control circuit between odd and even field modes.

Another flip-flop circuit 106 is also indexed by each vertical synchronization signal VDo to switch the read address circuit 72 between even and odd field modes.

Suitable patterns for implementing the 1.5 magnification embodied of FIG. 1 include an odd field pattern PD=(1, 1, 0) and an even field pattern PE=(1, 0, 1). These patterns are repetitively produced by the pattern generating circuit 92 when odd fields are to be displayed. Analogously, even and odd field patterns PD=(0, 1, 1) and PE=(1, 1, 0) are repetitively produced when even number fields are to be displayed. The flip-flop 104 indicates whether an even or odd number field patterns are to be generated. It is these patterns PD and PE from the pattern generating circuit 92 that are combined by the AND circuits 94 and 96 with the horizontal synchronization signal HDo to produce the odd enable circuit HDD and the even enable signal HDE.

Figure 6A:
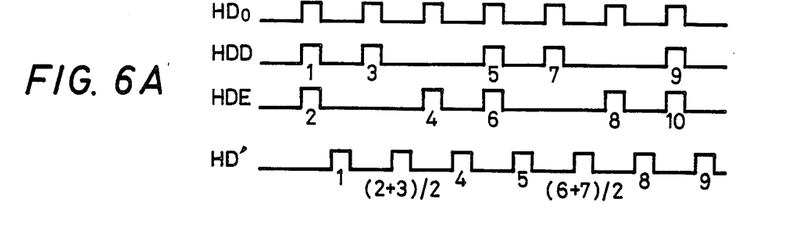
FIGS. 6A and 6B are time charts illustrating the operation for reading data from memory to form odd and even fields of the higher resolution video signal illustrated in FIG. 1.

With reference to FIG. 6A, in the odd field mode, both the odd and even memories are read. The (1, 1, 0) PD pattern causes an odd enable signal HDD which has pulses concurrent with the first and second horizontal synchronization circuit HDo and none concurrent with the 3rd. This pattern repeats every 3 HDo pulses. In this manner, the HDo pulse concurrent with the HDD and HDE pulses causes the even and odd lines to be transferred to the even and odd line memories. The pulse HD' each cause the selector means 24 to select the next of the even, odd, and interpolated lines in a preselected cyclic order.

The even signal HDE generated from the pattern (1, 0, 1) produces pulses concurrently with the first and third enable signals in each cycle. This causes the first line to be loaded into the odd memory 78A which is then selected by the first HD' signal as the first line of the odd field of the high resolution video signal. The second line is transferred into the even line memory 78B currently with the first HDo pulse and the third line is transferred into the odd line memory 78A concurrently with the second HDo pulse. The interpolating means 22 interpolates these two lines and produces an output which is the average of the second and third lines. In response to the second HD' pulse, the selector means 24 selects the output of the interpolator to be sampled. The HDE signal then causes the fourth line to be read out into the even line memory 78B concurrently with the third HDo pulse. The even line memory is read in response to the third HD' pulse. This pattern is cyclically repeated as the selector steps among the odd, even, and interpolated line values. In this manner, the odd field illustrated at 32 of FIG. 1 is produced.

Figure 6B:
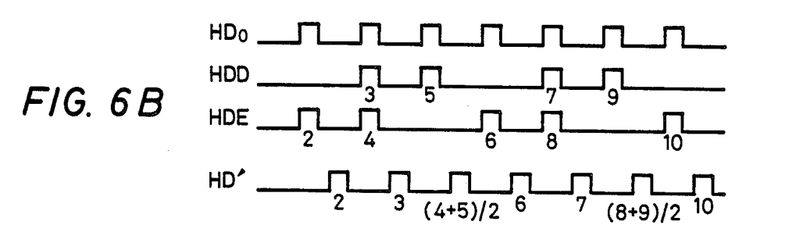

The even field 34 is produced with the patterns PD=(0, 1, 1) and PE=(1, 1, 0) as illustrated in FIG. 6B. The second line is shifted into the even line memory 78B which is sampled by the selecting means 24 in respond to the first HD' pulse. The third line is transferred into the odd line memory 78A and the fourth line is transferred into the even line memory 78B. In the even field mode, the data in the odd line memory 78A is read in response to the second HD' pulse. In the present example the odd line memory holds the third line. The next HDD pulses causes the fifth line to replace the third line in the odd line memory. The third HD' pulse causes the interpolator to be sampled, i.e. the average of the lines 4 and 5 the lines currently in the even and odd memories 78A and 78B. The sequence is then repeated to produce the even field 34 of FIG. 1.

Referring again to FIG. 2, each data line selected by the selecting means 24 is conveyed to a YC separating circuit 110 and a matrix circuit 112 which separates the blue, green, red (RGB) signal components. Digital to analog convertors 120 convert the digital blue, green, and red signals to corresponding analog signals at a rate selected by a read speed control circuit 122. Specifically, for a horizontal CRT scanning period TH and raster lines composed of DH dots, the read speed control circuit 122 supplies a signal of frequency DH/TH to the digital to analog convertors 120.

Figure 7:
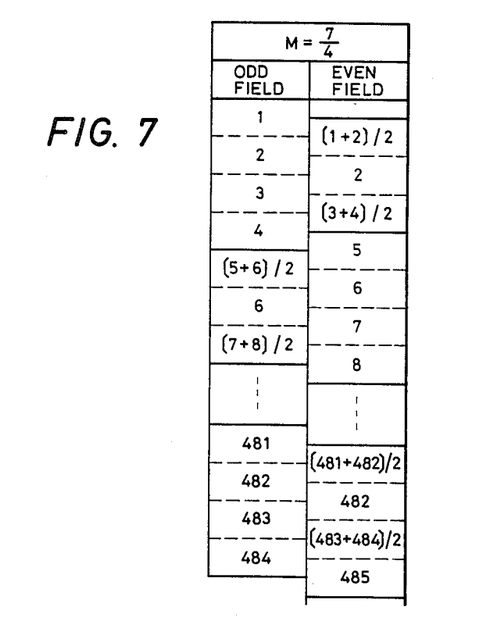
FIG. 7 illustrates a preferred sequence for reading odd, even, and interpolated scan lines which give a magnification of 7/4.
Figure 8A:
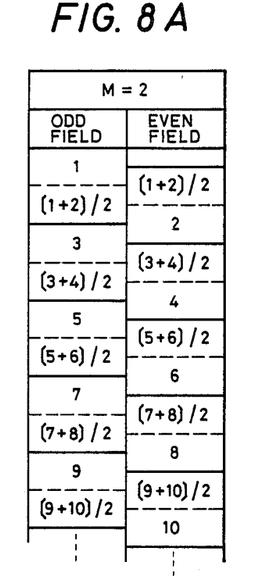
FIGS. 8A-F illustrate alternate line sequences for the improved resolution video signal which produce interger magnifications.
Figures 8B, 8C:
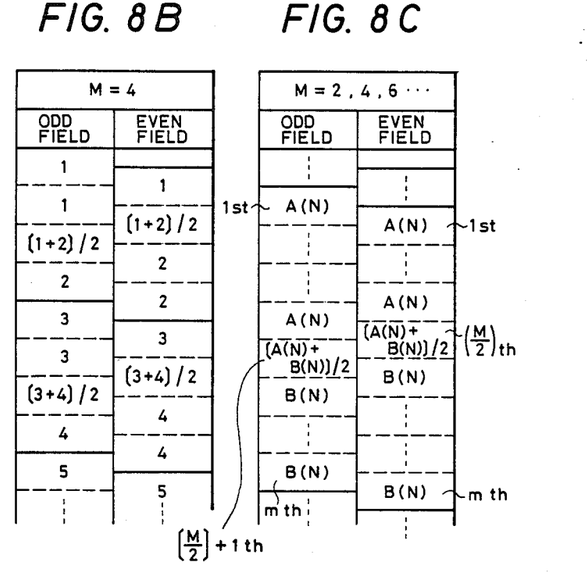
Figure 8D:
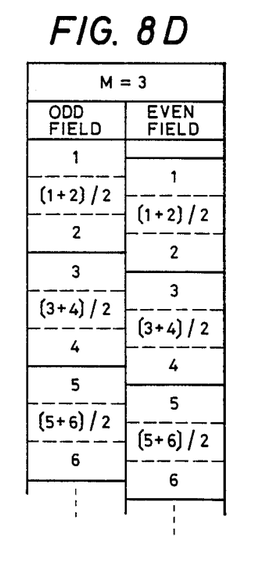
Figure 8E:
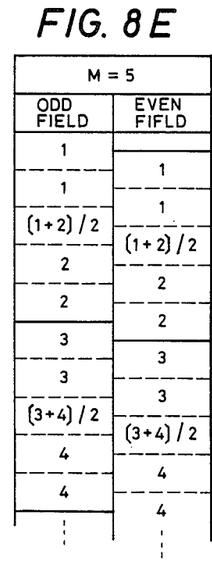
Figure 8F:
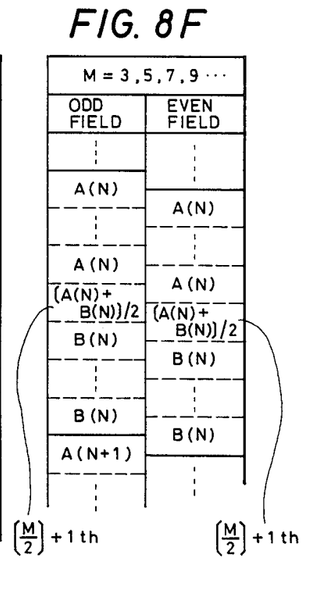
Figure 9A:
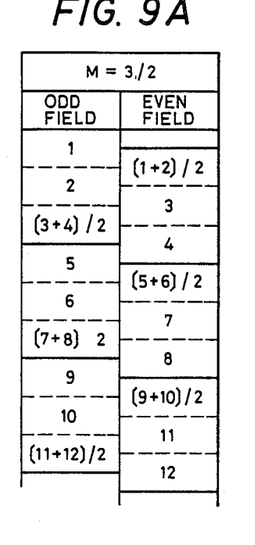
FIGS. 9A-F illustrate alternate line sequences for the high resolution video signal for producing fractional magnifications.
Figure 9B:
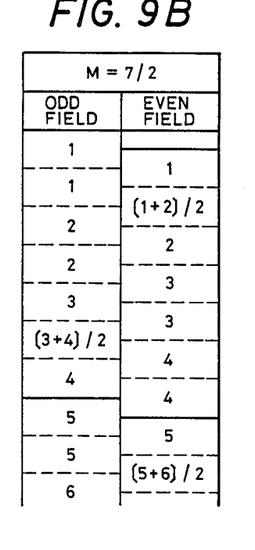
Figure 9C:
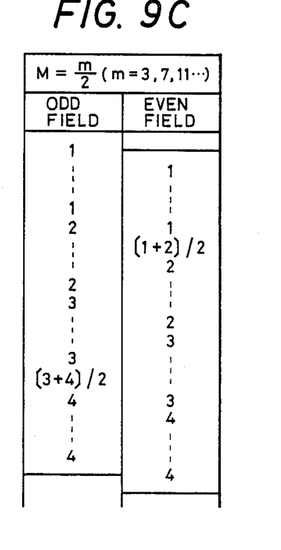
Figure 9D:
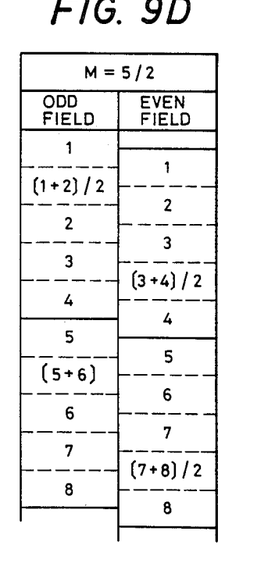
Figure 9E:
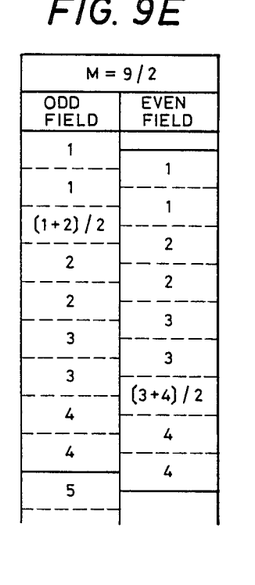
Figure 9F:
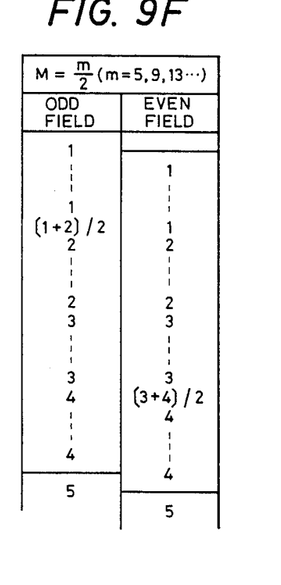

With reference to FIG. 7, fractional magnifications other than multiples of 1½ may also be produced. A fractional multiplication of 7/4 has been found to be particularly advantageous. A magnification of 7/4ths expands a standard NTSC signal to about 850 lines. In each cycle, seven lines are read. In the odd field, the even and odd lines alternately read to produce the first four lines, then the interpolated and even lines are alternately read to produce three more lines. That is, the odd field includes lines 1, 2, 3, 4, (5+6)/2, 6, (7+8)/2, . . . The even field is similar but with a pattern in the reverse order. The alternating averaged and even lines precede the alternating odd and even lines. More specifically to the preferred embodiment, the even field is lines (1+2)/2, 2, (3+4)/2, 5, 6, 7, 8, . . .

With reference to FIGS. 8A–8F, it is to be appreciated that other magnifications are also contemplated. Specifically, interger magnifications may be produced with an odd field line sampling pattern A (N), . . . A (N), [A (N)+B (N)]/2, B (N), . . . B (N). The even line numbers may be produced with the analogous pattern. FIGS. 8A–8F illustrate specific magnifications and implementations of this general formula. FIGS. 9A–9F illustrate analogous fractional magnifications.

Referring again to FIG. 2, the circuit includes means 130 for adjusting or selecting the magnifications, such as selecting among the magnifications of FIGS. 8 and 9 and others. The magnification adjusting means 130 includes a ROM address generator 132 which converts an input magnification request to a corresponding address to a ROM memory means 134 which stores patterns corresponding to each selectable magnification. The patterns for the selected magnification are conveyed to the pattern generating circuit 92. The ROM memory means 134 further includes a selected sequence indication which is conveyed to the sequence circuit 102 to control the order in which the selecting means 24 addresses the odd and even line memories 78A and 78B and the interpolating means 22. The ROM memory means 134 further provides a signal to the serial clock means 76 for adjusting the clocking rate for clocking lines out of the shift register. This clocking rate change adjusts the magnification or degree of extension of the length, i.e. the percentage of dots or digital data values which are twice conveyed from the shift register to each line memory.

Figure 10:
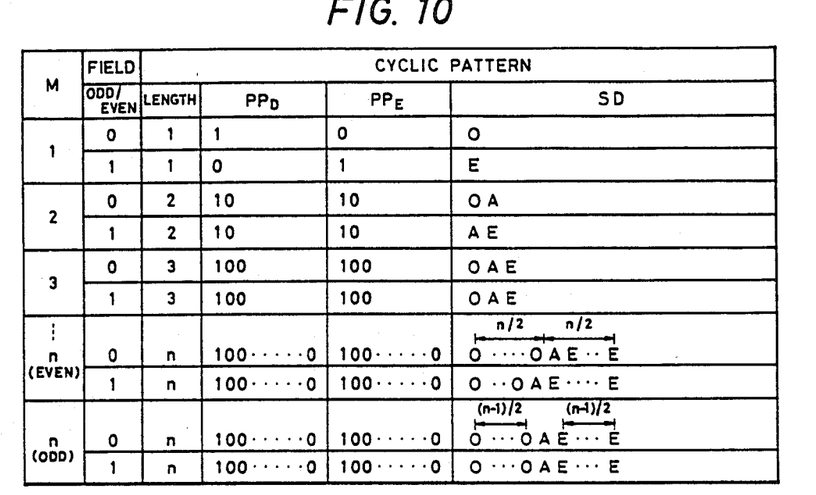
FIG. 10 illustrates data stored in a ROM memory of the circuit of FIG. 2 for selecting the interger magnifications of FIGS. 8A-8F.
Figure 11:
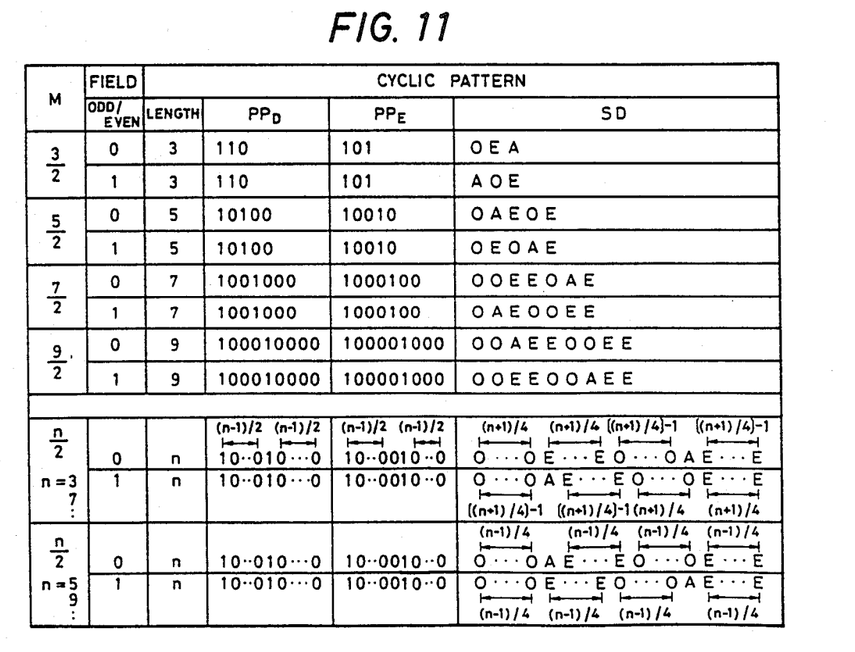
FIG. 11 illustrates information stored in the ROM of the magnification selecting circuit of FIG. 2 for achieving the fractional magnifications illustrated in FIGS. 9A-F.

With reference to FIGS. 10 and 11, exemplary patterns and selection sequences that may be stored in the ROM memory means 134 are illustrated. For example, for a magnification of 1 the odd or 0 field has a length of 1 line. The odd pattern PD is a 1 and the even pattern PE is a O. In the odd field mode, the selector only selects the lines from the odd line memory 78A. Analogously, for the even field, the even pattern PE is 1 with a cycle of 1 line. The odd line memory enable pattern PD is a O. The selector repeatedly selects the even line memory output. Other magnifications with the corresponding cycle length, patterns, selector order, and the like are also illustrated in FIGS. 10 and 11.

Figure 12:
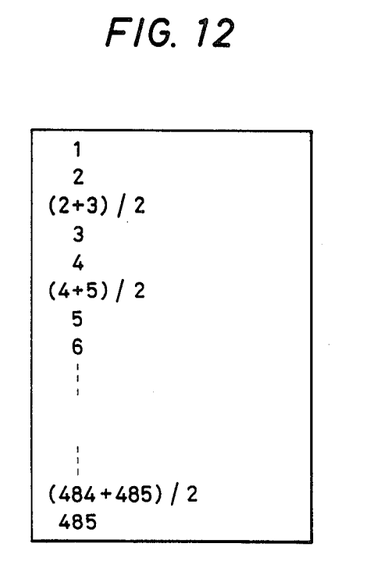
FIG. 12 illustrates another alternate read line sequence pattern for use with a high resolution monitor that does not interlace raster lines.

With reference to FIG. 12, the present invention is also applicable for converting lower resolution video signals for display on non-interlaced high resolution CRTs or monitors. Various magnifications discussed above can be produced in a non-interlaced field by producing the odd and even field lines alternately. Looking by way of example to the 150% magnification discussed in conjunction with FIG. 1, the non-interlaced field is composed of the lines 1, 2, (2+3)/2, 3, 4, (4+5)/2, 5, etc.

The invention has been described with reference to the preferred embodiments. Obviously, modifications and alterations will occur to others upon reading and understanding the preceding detailed description. It is intended that the invention include all such alterations and modifications insofar as they come within the scope of the appended claims or the equivalents thereof.

Having thus described the preferred embodiments, the invention is now claimed to be:

1. An apparatus for enabling a lower resolution interlaced field video signal which has complete odd line fields that alternate cyclically with complete even line fields, in which complete odd line field and complete even line fields would be displayed alternately on a lower resolution video monitor to be displayed on a higher resolution video monitor, the apparatus comprising:

a digitizing means for converting each received line of each even line field and of each odd line field to a pre-selected plurality of digital values;

a write address means for determining a memory address corresponding to each digital value, the address being indicative of the field, a line number, and a position along the line;

a memory means for storing the digital values in conjunction with the determined corresponding addresses, the memory means being operatively connected with the digitizing means and the write address means;

a read address means for addressing the memory means to read digital values corresponding to selected lines of the odd and even line field;

an odd line field memory means for receiving and holding a line of the odd line field digital values read from the memory means;

an even line memory means for receiving and holding a line of the even line field digital values read from the memory means;

an interpolating means for interpolating the digital values of an even line field from the even line memory means with the digital values of an odd line field from the odd line memory means to produce an interpolated line of digital values;

a selecting means for cyclically selecting a mix of even field, odd field, and interpolated lines for display in a common higher resolution field on the higher resolution video monitor.

2. The apparatus as set forth in claim 1 further including a control means for controlling an order with which even and odd lines are read from the memory means into the even and odd line memory means.

3. An apparatus for enabling a lower resolution video signal to be displayed on a higher resolution video monitor, the apparatus comprising:

a digitizing means for converting each received line of the lower resolution video signals to a preselected plurality of digital values;

a write address means for determining a memory address corresponding to each digital value, the address being indicative of a line number within a video picture and a position along the line;

a memory means for storing the digital values in conjunction with the determined corresponding addresses, the memory means being operatively connected with the digitizing means and the write address means;

a read address means for addressing the memory means to read digital values corresponding to selected odd and even numbered lines;

an odd line memory means for receiving and holding the odd numbered lines of digital values read from the memory means;

an even line memory means for receiving an holding the even numbered lines of digital values read from the memory means;

an interpolating means for interpolating the digital values of an even numbered line from the even line memory means with the digital values of an odd numbered line from the odd line memory means to produce an interpolated line of digital values;

a selecting means for cyclically selecting even, odd, and interpolated lines for display on the higher resolution video monitor; and, a control means for controlling an order with which even and odd lines are read from the memory means into the even and odd line memory means in accordance with patterns received from a pattern means, whereby the pattern controls a magnification or increase in the number of lines per picture supplied to the high resolution monitor by controlling the pattern with which lines are read.

4. The apparatus as set forth in claim 3 further including a selection sequence means for selecting a sequence or order with which the selecting means cyclically selects the even, odd, and interpolated lines of digital values.

5. The apparatus as set forth in claim 3 further including a magnification selecting means for selecting a degree of increase in the number of lines from the low resolution video signals to the number of lines supplied to the high resolution monitor, the magnification selecting means being operatively connected with the pattern means and the selection sequence means.

6. The apparatus as set forth in claim 5 wherein the magnification selecting means includes a magnification memory means for storing patterns and selected sequences for each of a plurality of magnifications, the magnification memory means being operatively connected with the patterns means for selectively supplying stored patterns thereto and with the selection sequence means for selectively supplying selection sequences thereto.

7. The apparatus as set forth in claim 6 further including a line magnification means for selectively controlling an increase in a number of digital values per line as the digital data is read from the memory means to the even and odd line memory means, the line magnification means being operatively connected with the magnification memory means to receive magnification information therefrom.

8. An apparatus for enabling a lower resolution video signal to be displayed on a higher resolution video monitor, the apparatus comprising:

a digitizing means for converting each received line of the lower resolution video signals to a preselected plurality of digital values;

a write address means for determining a memory address corresponding to each digital value, the address being indicative of a line number within a video picture and a position along the line;

a memory means for storing the digital values in conjunction with the determined corresponding addresses, the memory means being operatively connected with the digitizing means and the write address means;

a read address means for addressing the memory means to read digital values corresponding to selected odd and even numbered lines;

an odd line memory means for receiving and holding the odd numbered lines of digital values read from the memory means;

an even line memory means for receiving and holding the even numbered lines of digital values read from the memory means;

an interpolating means for interpolating the digital values of an even numbered line from the even line memory means with the digital values of an odd numbered line from the odd line memory means to produce an interpolated line of digital values;

a selecting means for cyclically assembling a sequence in which even, odd, and interpolated lines are displayed on the higher resolution video monitor; and, a magnification selecting means for selectively altering the sequence in which odd, even, and interpolated data lines are assembled for display on the video monitor.

9. A method for converting an interlaced field lower resolution video signal having sequential odd fields and even fields, each field having a first plurality of raster lines of analog data into a higher resolution video signal having sequential fields, each field having a larger plurality of raster lines, the method comprising:

digitizing each analog raster line of an even field and each analog raster line of an odd field into a pre-selected plurality of digital values;

storing the digital values in accordance with a low resolution video signal field, line number, and position within the line;

selectively reading digital values corresponding to even and odd field raster lines;

interpolating corresponding digital values of odd field raster lines and even field raster lines;

assembling the interpolated lines and at least one of the odd and even field raster lines into a common field of the higher resolution video signal, whereby each higher resolution video signal field includes data derived from at least two lower resolution signal fields.

10. The method as set forth in claim 9 wherein odd field, even field, and interpolated lines are cyclically arranged in a selected sequence.

11. The method as set forth in claim 10 further including selectively changing the sequence with which the odd field, even field, and interpolated lines are assembled in order to select a number of lines in the high resolution video signal, whereby magnification of the low resolution video signal is selectively adjustable.

12. The method as set forth in claim 11 further including selectively expanding a number of digital values in each line, such that the number of digital values per line in the high resolution video signal is greater than the number of digital values per line in the lower resolution video signal.

13. The method as set forth in claim 11 wherein in the assembling step, odd field lines, and an interpolation of adjacent odd and even field lines, and even field lines are cyclically assembled.

14. A method for converting a lower resolution video signal having a first plurality of raster lines of analog data into a higher resolution video signal that includes two fields, the method comprising:

digitizing each analog raster line of the lower resolution video signal into a pre-selected plurality of digital values;

storing the digital values in accordance with a low resolution video signal line number and position within the line;

selectively reading digital values corresponding to even and odd numbered lines;

interpolating corresponding digital values of adjacently numbered read odd and even lines; and, in one of the fields, arranging lines in a repeating sequence of: a selected number of repetitions of an odd line, an average of the odd line and an adjacent even line, and a selected number of repetitions of the adjacent even line.

15. A method for converting a lower resolution video signal having a first plurality of raster lines of analog data into a high resolution signal having two fields, the method comprising:

digitizing each analog raster line of the lower resolution video signal into a pre-selected plurality of digital values;

storing the digital values in accordance with a low resolution video signal line number and position within the line;

selectively reading digital values corresponding to even and odd numbered lines;

interpolating corresponding digital values of adjacently numbered read odd and even lines;

assembling the interpolated lines and at least one of the odd and even numbered lines into one of the fields of the higher resolution video signal, in a sequence which includes the first line of the low resolution data, the second line, the third line, the fourth line, an interpolation of the fifth and the sixth lines, the sixth line, and an interpolation of the seventh and eighth lines.

16. A method of displaying interlaced field low resolution video signals arranged in sequentially received odd number line fields and even number line fields on a higher resolution CRT, the method comprising:

storing raster lines of each even numbered line field in a first memory means and raster lines of each odd numbered line field in a second memory means;

reading raster lines from each of the first and second memories one line at a time;

selectively interpolating adjacently numbered odd and even field raster lines into interpolated raster lines; and, assembling the read odd field, even field, and interpolated lines in a pre-selected cyclic order to produce a common high resolution video signal field with a larger number of lines per picture for display on the CRT, such that the high resolution field includes lines from a plurality of lower resolution fields.

* * * * *